United States Patent [19]
Miura et al.

[11] Patent Number: 6,084,039
[45] Date of Patent: *Jul. 4, 2000

[54] EPOXY RESIN COMPOSITION

[75] Inventors: Mareki Miura; Yoshinobu Ohnuma, both of Yokkaichi, Japan

[73] Assignee: Shell Oil Company, Houston, Tex.

[*] Notice: This patent is subject to a terminal disclaimer.

[21] Appl. No.: 09/033,963

[22] Filed: Mar. 3, 1998

[30] Foreign Application Priority Data

Mar. 3, 1997  [JP]  Japan ................................. 9-061712

[51] Int. Cl.⁷ .................................................... C08G 59/04
[52] U.S. Cl. .............................. 525/524; 528/98; 549/517
[58] Field of Search ............................ 525/524; 528/98; 549/517

[56]  References Cited

U.S. PATENT DOCUMENTS 5,880,246  3/1999  Miura et al. .............................. 528/98

FOREIGN PATENT DOCUMENTS 10-025286  1/1998  Japan .

*Primary Examiner*—Robert Dawson
*Assistant Examiner*—D. Aylward
*Attorney, Agent, or Firm*—Y. Grace Tsang

[57]  ABSTRACT

An epoxy resin which is useful as adhesives, resins for coatings, encapsulants, resins for a lamination board, casting materials, molding compounds, and electric insulators, and which can provide a cured resin having excellent heat resistance and moisture resistance is provided which comprises (A) an epoxy resin containing a trisepoxy compound represented by general formula (I), and (B) a curing agent for an epoxy resin, (I)

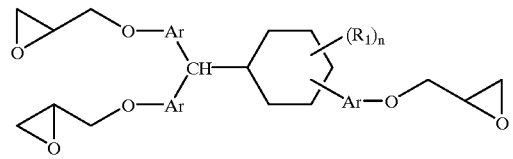

wherein $R_1$ is a methyl group, n is an integer of 0 to 2, and Ar is a group selected from general formula (II)

(II)

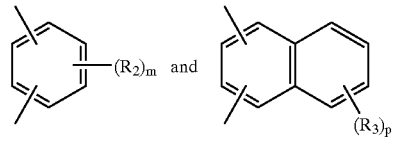

wherein $R_2$ and $R_3$ are an alkyl group having a carbon number of 1 to 6, an alkoxy group having a carbon number of 1 to 6, or a halogen atom, and m and p are an integer of 0 to 2.

6 Claims, No Drawings

EPOXY RESIN COMPOSITION

FIELD OF THE INVENTION

The present invention relates to an epoxy resin composition which is useful as adhesives, resins for coatings, encapsulants, resins for a lamination board, casting materials, molding compounds, and electric insulators, and which can provide a cured resin having an excellent heat resistance and moisture resistance.

BACKGROUND OF THE INVENTION

An epoxy resin has been employed in a variety of fields because of the excellence in heat resistance, mechanical strength, and electric properties, etc. As the epoxy resin, although there are usually employed a diglycidyl ether of bisphenol A and a phenol novolak type one, particularly, in a field in which heat resistance is required, there have been known an epoxide of a polyphenol obtained by a condensation reaction of hydroxybenzaldehydes with phenols and a composition thereof (JP-A-57141419 Official Gazette), and an resin composition containing an epoxide of a polyphenol obtained from unsaturated aliphatic aldehydes such as croton aldehyde (JP-A-61168620 Official Gazette). However, although the epoxy resin compositions are excellent in heat resistance, there are problems that insulation properties lower in the case of employing as electric insulators, and cracks are caused in a package in the case of employing as encapsulants for semiconductors because of a high water absorptive property.

On the other hand, for the purpose of improving water resistance, there is proposed an epoxy resin composition (JP-A-61291615) having alicyclic structures in the molecule which is obtained from dicyclopentadiene.

However, in the epoxy resin composition, although water resistance is improved, heat resistance lowers and flame retardancy is poor, namely, there is a problem that it is not preferred in view of reliability at high temperature.

SUMMARY OF THE INVENTION

An epoxy resin composition comprising: (A) an epoxy resin containing a trisepoxy compound represented by general formula (I)

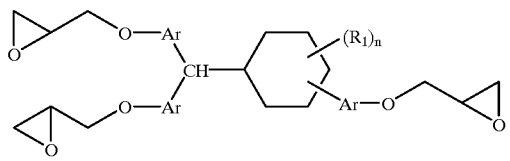

(I)

wherein $R_1$ is a methyl group, n is an integer of 0 to 2, and Ar is a group selected from general formula (II)

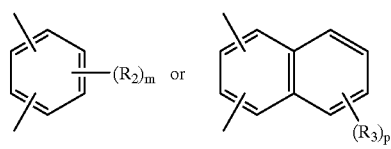

(II)

wherein $R_2$ and $R_3$ are an alkyl group having a carbon number of 1 to 6, an alkoxy group having a carbon number of 1 to 6, or a halogen atom, and m and p are an integer of 0 to 2, and (B) a curing agent for an epoxy resin.

DETAILED DESCRIPTION OF THE INVENTION

The present invention, by which the problems are solved, aims at providing a novel curable resin composition having a well-balanced heat resistance and water resistance. It has been found that the above-mentioned problems can be solved by mixing (A) an epoxy resin containing a specified epoxy compound with (B) a curing agent.

That is, a first aspect of the present invention is a curable epoxy resin composition characterized by essentially containing two components composed of the component (A): an epoxy resin containing a trisepoxy compound represented by general formula (I),

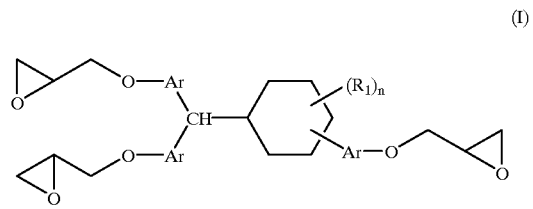

(I)

wherein $R_1$ is a methyl group, n is an integer of 0 to 2, and Ar is a group selected from general formula (II)

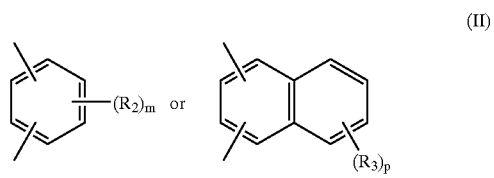

(II)

wherein $R_2$ and $R_3$ are an alkyl group having a carbon number of 1 to 6, an alkoxy group having a carbon number of 1 to 6, or a halogen atom, and m and p are an integer of 0 to 2, and (B) a curing agent for an epoxy resin.

A second aspect of the present invention is the above-mentioned epoxy resin composition characterized in that the epoxy resin which is the component (A) contains 5 to 100% by weight of the epoxy compound represented by the above-mentioned general formula (I).

A third aspect of the present invention is the epoxy resin composition of the present invention in the above-mentioned aspects 1 and 2 characterized in that the epoxy resin which is the component (A) contains 10 to 90% by weight of oligomer components of the trisepoxy compound together with the trisepoxy compound represented by the above-mentioned general formula (I).

A fourth aspect of the present invention is the epoxy resin composition of the present invention in the above-mentioned aspect 1, 2, or 3 characterized in that the epoxy resin which is the component (A) contains 15 to 85% by weight of an epoxy compound having at least 2 epoxy groups in a molecule other than said trisepoxy compound represented by the above-mentioned general formula (I).

A fifth aspect of the present invention is the epoxy resin composition of the present invention in the above-mentioned aspects 1 to 5 characterized in that the above-mentioned curing agent for an epoxy resin is a compound selected from the group consisting of amines, acid anhydrides, polyphenols, imidazoles, borontrifluoride complexes of an amine, dicyan diamides, hydrazides of an organic acid, polymercaptans, and organic phosphines.

A sixth aspect of the present invention is the epoxy resin composition of the present invention in the above-mentioned aspects 1 to 5 characterized in that the above-mentioned curing agent which is the component (B) is mixed in a range of 0.1 to 200 parts by weight based on 100 parts by weight of the above-mentioned epoxy resin which is the component (A).

In the present invention, the specific epoxy resin which is represented by the above-mentioned general formula (I) to be employed as the component (A) can be obtained by a reaction of a polyphenol compound represented by general formula (III) described below with an epihalohydrin.

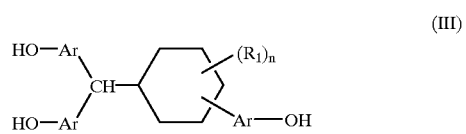

(III)

wherein $R_1$, Ar, and n are the same as above-mentioned.

Further, in the epoxy resin to be employed as the component (A) in the present invention, there are contained oligomer components of the trisepoxy compound represented by general formula (IV) described below other than the trisepoxy compound.

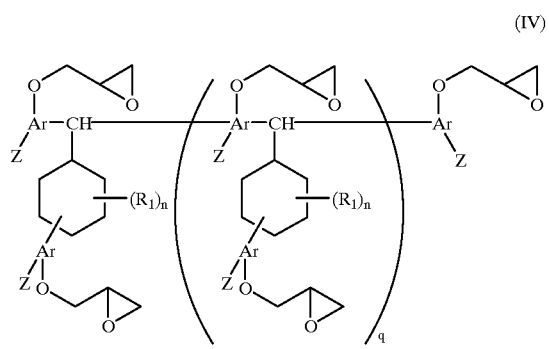

(IV)

wherein $R_1$, Ar, and n are the same as above-mentioned, q is an integer of 1 to 5, and Z is a hydrogen atom and general formula (V),

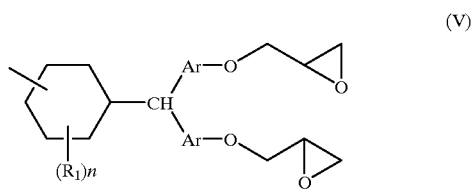

(V)

wherein $R_1$ and Ar are the same as above-mentioned.

A polyphenol compound represented by the above-mentioned general formula (III) can be obtained by a reaction of an aliphatic unsaturated aldehydes represented by the following general formula (VI)

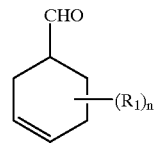

(VI)

wherein $R_1$ and n are the same as above-mentioned with phenols having a carbon number of 6 to 20 while heating in the presence of an acid catalyst such as phosphotungstic acid and silicotungstic acid.

In the reaction, there are simultaneously produced oligomer components of the polyphenol compound represented by the above-mentioned general formula (III), which are represented by general formula (VII) described below,

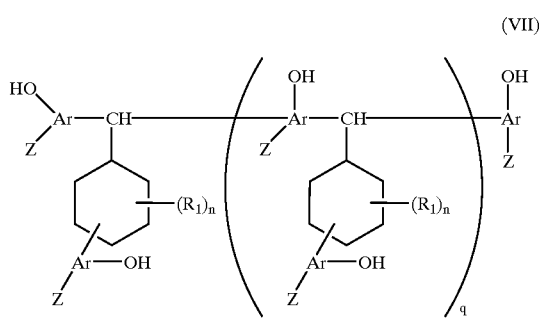

(VII)

wherein Ar, $R_1$, and n are the same as above-mentioned, q is an integer of 1 to 5, and Z is the following general formula (VIII),

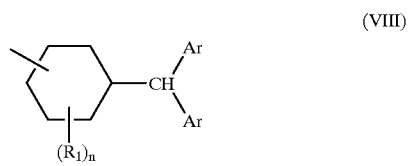

(VIII)

wherein $R_1$, Ar, and n are the same as above-mentioned.

Amount ratio of the polyphenol compound of the general formula (III) with respect to the oligomer components of the general formula (VII) can be freely adjusted by changing an amount ratio of raw compounds to be fed.

The oligomer components represented by the above-mentioned general formula (IV) can be obtained by a reaction of the oligomer components represented by the general formula (VII) with an epihalohydrin.

Further, an epoxy resin containing a trisepoxy compound of general formula (I) and the oligomer components of a trisepoxy compound of the general formula (IV) can be obtained by a reaction of a mixture composed of the polyphenol compound of the above-mentioned general formula (IV) and the oligomer components of the general formula (VII) with the epihalohydrin.

There are described in detail the polyphenol compound represented by the above-mentioned general formula (III), a process for the preparation of a mixture composed of the polyphenol compound and the oligomer components represented by the above-mentioned general formula (VII), and a process for the preparation of epoxy compounds thereof represented by the formula (I) and the formula (IV) in Japanese Patent Application No. 177996/1996.

As amount ratio of the trisepoxy compound with respect to the oligomers of the trisepoxy compound contained in the epoxy resin, the trisepoxy compound ranges from 5 to 100% by weight, and preferably from 10 to 90% by weight. In the case that the trisepoxy compound is less than 5% by weight, viscosity increases in the resin composition of the present invention, unpreferably resulting in being problematic in that handling and moldability become worse.

Further, in the epoxy resin composition which is the component (A), a usual epoxy resin having at least 2 epoxy groups in a molecule may be mixed in a range of 15 to 85% by weight based on the trisepoxy compound.

As specific examples of the epoxy resin to be mixed, there are exemplified a bisphenol type epoxy resin such as a diglycidyl ether of bisphenol A and a diglycidylether of bisphenol F, a biphenol type epoxy resin, a phenol novolak epoxy resin, a cresol novolak epoxy resin, a glycidyl amine compound obtained from an aminophenol and diaminodiphenyl methane, etc., a glycidyl ester compound obtained from phthalic acid and hexahydrophthalic acid, an aliphatic glycidylether obtained from 1,4-butanediol or 1,6-hexanediol, a cycloaliphatic epoxy resin obtained from a hydrogenated bisphenol A and dicyclopentadiene, etc., a brominated epoxy resin obtained from a brominated bisphenol A, and a brominated phenol, etc., and a multi-functional epoxy resin, etc. obtained from trishydroxyphenyl methane, etc.

The curing agent for an epoxy resin to be employed as the component (B) in the present invention includes a usual curing agent for an epoxy resin, for example, those are exemplified below.

(1) amines; aliphatic and cycloaliphatic amines such as triethylenetetramine, tetraethylenepentamine, N-aminoethylpiperazine, isophoronediamine, bis(4-aminocyclohexyl)methane, m-xylylenediamine, 3,9-bis(3-aminopropyl)-2,4,8,10-tetraspiro[5,5]undecane, aromatic amines such as metaphenylenediamine, diaminodiphenylmethane, and diamnnodiphenylsulfone, and tertiary anines such as benzyldimethylamine, 2,4,6-tris(dimethylaminomethyl)phenol, DBU, and DBN.

(2) acid anhydrides; aromatic acid anhydrides such as phthalic anhydride, trimellitic anhydride, and pyromellitic anhydride, cycloaliphatic acid anhydrides such as tetrahydrophthalic anhydride, methyltetrahydrophthalic anhydride, hexahydrophthalic anhydride, methylendomethylene tetrahydrophthalic anhydride, dodecenylsuccinic anhydride, and trialkyltetrahydrophthalic anhydride.

(3) polyphenols; catechol, lesorcin, hydroquinone, bisphenol F, bisphenol A, bisphenol S, and biphenol, novolak compounds of a divalentphenol such as phenol novolaks, cresol novolaks, and bisphenol A, trishydroxyphenylmethanes, aralkylpolyphenols, and dicyclopentadiene polyphenols, etc.

(4) others; imidazole-based compounds, $BF_3$ complex compounds of an amine, dicyandiamides, hydrazides of an organic acid, polymercaptans, and organic phosphine compounds, etc.

The curing agents may be solely employed, and two or more of kinds can be also employed.

As mixing proportion of the above-mentioned component (A) with respect to the component (B), the curing agent which is the component (B) is mixed in a range of 0.1 to 200 parts by weight based on 100 parts by weight of the epoxy resin which is the component (A). Outside of the above-mentioned range, beat resistance and moisture resistance are not unpreferably well-balanced in a cured epoxy resin.

In the epoxy resin composition of the present invention, the following components can be optionally mixed as additives.

(1) powdered reinforcing materials and fillers, for example, metal oxides such as aluminum oxide and magnesium oxide, metal carbonates such as calcium carbonate and magnesium carbonate, silicone compounds such as powdered diatomaceous earth, a basic magnesium silicate, calcined clays, finely-powdered silica, fused silica, and crystalline silica, metal hydroxides such as aluminum hydroxide, and, kaoline, mica, powdered quartz, graphite, molybdenum disulfide, etc., and further, fibrous reinforcing materials and fillers, for example, fiberglass, ceramic fibers, carbon fibers, alumina fibers, silicone carbide fibers, boron fibers, polyester fibers and polyamide fibers, etc.

(2) coloring agents, pigments, flame retardants, for example, titanium dioxide, Iron Black, Molybdenum Red, Navy Blue, Ultramarine Blue, Cadmium Yellow, Cadmium Red, antimony trioxide, red phosphorus, halogenated compounds, and triphenylphosphate, etc.

(3) Further, there can be mixed a variety of curable monomers and oligomers, and synthetic resins for the purpose of improving properties of resins in final coating layers, adhesive layers, and molded articles, etc. For example, there are exemplified one or more kinds of diluents for epoxy resins such as monoepoxides, phenol resins, alkyd resins, melamine resins, fluorocarbon resins, polyvinyl chloride resins, acrylic resins, silicone resins, polyester resins. Mixing proportion of the resins is an amount range in which there are not deteriorated inherent properties in the resin composition of the present invention, that is, it is preferably less than 50% by weight based on the total resins.

As means for mixing the (A), (B), and optional components in the present invention, there are exemplified a melt mixing method while heating, a melt kneading method by a roll or a kneader, a wet mixing method with an appropriate solvent and a dry blend method, etc.

Illustrative Embodiment

EXAMPLES

Hereinafter, the present invention is further illustrated in detail by non-limiting Examples and Comparative Examples. It is to be noted that "part" in the Examples means "part by weight".

Preparation of Epoxy resin (1):

A 1-liter four-necked flask equipped with a thermometer, an agitator, and a condenser was charged with 564 g (6 mol) of phenol, 44 g (0.4 mol) of 3-cyclohexene-1-carbaldehyde, and 4.4 g of silicotungstic acid, followed by carrying out a reaction at 80° C. for 7 hours. After completion of the reaction, silicotungstic acid was neutralized by adding 1.8 g of 24%-sodium hydroxide, and then unreacted phenol was distilled out with a rotary evaporator at a bath temperature of 160° C. under reduced pressure.

Subsequently, after 400 g of methylisobutyl ketone was added into a system to dissolve, a product was thrice washed with 300 g of pure water to remove inorganic substances.

After washing with water, methylisobutyl ketone was distilled out at 100 to 160° C. under reduced pressure to obtain 129 g of a polyphenol compound (a mixture composed of 70% of trisphenol compound and 30% of oligomer components thereof) which is a brownish and glassy solid.

A 1-liter four-necked flask equipped with a thermometer, an agitator, and a condenser was charged with 110.6 g (0.7 equivalent) of the polyphenol compound prepared as described hereinabove, 456 g (4.93 mol) of epichlorohydrin, and 177.8 g of isopropylalcohol, followed by dissolving at 45° C.

Subsequently, while 75.5 g of 50%-aqueous solution of sodium hydroxide was added dropwise over 1 hour, the temperature was elevated to 70° C., followed by carrying out an epoxidation reaction at the temperature for 30 minutes while continuing to agitate. After completion of the reaction, unreacted epichlorohydrin and isopropyl alcohol were distilled out at 80 to 140° C. under reduced pressures. Subsequently, 400 g of methylisobutylketone was added into system to dissolve, followed by washing with 300 g of pure water four times to remove inorganic substances. After washing with water, methylisobutyl ketone was distilled out at 100 to 150° C. under reduced pressures to obtain 130 g of a glassy solid polyepoxy compound which is yellow-colored composed of 63.3% of trisepoxy compound and 36.7% of oligomer components thereof Epoxy equivalent (g/equiv.) 226

Preparation of Epoxy resin (2):

A polyepoxy compound was prepared by a reaction of the polyphenol compound (a mixture composed of 76.3% of trisphenol compound and 23.7% of oligomer components thereof) prepared from α-naphthol (6 mol) and 3-cyclohexene-1-carbaldehyde (0.4 mol) with epichlorohydrin according to the process for preparation of the above-mentioned Epoxy resin (1). Trisepoxy compound 68.6% and oligomer components thereof 31.4%

Epoxy equivalent (g/equiv.) 370

Example 1

100 parts of Epoxy resin (1) and 46 parts of a phenol novolak resin (a trade name, VR2210 manufactured by Mitsui Toatsu, Ltd.) primarily containing 3 nuclides were mixed at 130° C. After removal of gases to prepare a homogeneous solution, 1 part of triphenylphosphine was added, followed by quickly mixing while agitating to obtain a composition.

Subsequently, the above-mentioned composition was cast into a mold, followed by curing at 180° C. for 7.5 hours in an oven to obtain a cured resin. The physical properties of the cured resin are shown in Table 1.

Example 2

The same operations were followed as in the Example 1, except that the Epoxy resin (1) was changed to 100 parts of Epoxy resin (2) to obtain a composition, and then a cured resin. The physical properties of the cured resin are shown in Table 1.

Comparative Example 1

The same operations were followed as in the Example 1, except that the Epoxy resin (1) was changed to 100 parts of a three-functional epoxy resin (a trade name, E1032S50 manufactured by Yuka Shell Epoxy, Ltd.) to obtain a composition, and then a cured resin. The physical properties of the cured resin are shown in Table 1.

Comparative Example 2

The same operations were followed as in the Example 1, except that the Epoxy resin (1) was changed to a dicyclopentadiene phenol novolak resin (EXA 7200, a trade name by Dainippon Ink, Ltd.) to obtain a composition, and then a cured resin. The physical properties of the cured resin are shown in Table 1.

Example 3

100 parts of the Epoxy resin (1) and 67 parts of methyltetrahydrophthalic anhydride (a trade name, HN2200 manufactured by Hitachi Kasei, Ltd.) were mixed at temperature of 80° C. After removal of gases to prepare a homogeneous solution, 1 part of 2-ethyl-4-methylimidazole (EM12,4, a trade name by Yuka Shell Epoxy, Ltd.) was added, followed by quickly mixing while agitating to obtain a composition.

Subsequently, the above-mentioned composition was cast into a mold, followed by curing at 80° C. for 3 hours, and further, at 150° C. for 6 hours in an oven to obtain a cured resin. The physical properties of the cured resin are shown in Table 2.

Example 4

The same operations were followed as in the Example 3, except that the Epoxy resin was changed to 100 parts of the Epoxy resin (2) to obtain a composition, and then a cured resin. The physical properties of the cured resin are shown in Table 2.

Example 5

The same operations were followed as in the Example 3, except that the Epoxy resin was changed to 50 parts of the Epoxy resin (1) and 50 parts of a glycidylether of bisphenol A (Epikote 828, a trade name by Yuka Shell Epoxy, Ltd.) to obtain a composition, and then a cured resin. The physical properties of the cured resin are shown in Table 2.

Comparative Example 3

The same operations were followed as in the Example 3, except that the Epoxy resin (1) was changed to 100 parts of a phenol novolak epoxy resin (E154, a trade name by Yuka Shell Epoxy, Ltd.) to obtain a composition, and then a cured resin. The physical properties of the cured resin are shown in Table 2.

TABLE 1

|  | Example 1 | Example 2 | Comparative Example 1 | Comparative Example 2 |
| --- | --- | --- | --- | --- |
| Epoxy resin | Epoxy resin (1) (100) | Epoxy resin (2) (100) | E1032S50 (100) | EXA7200 (100) |
| Curing agent | VR3310 (46) | same as the left (28) | same as the left (61) | same as the left (40) |

TABLE 1-continued

| | Example 1 | Example 2 | Comparative Example 1 | Comparative Example 2 |
|---|---|---|---|---|
| Curing accelerator | TPP (1) | same as the left (1) | same as the left (1) | same as the left (1) |
| Viscosity of a composition (ps) *1 | 0.8 | 1.5 | 0.8 | 0.6 |
| Glass transition temperature (° C.) *2 | 164 | 177 | 166 | 110 |
| Water absorption (%) *3 | 1.26 | 0.91 | 1.92 | 1.06 |

*1 150° C., ICI viscometer
*2 TMA method
*3 Water absorption ratio after 168 hours at 85° C. and in 85% RH
In the Table, abbreviation is as follows.
TPP: Triphenylphosphine

TABLE 2

| | Example 3 | Example 4 | Comparative Example 5 | Comparative Example 3 |
|---|---|---|---|---|
| Epoxy resin | Epoxy resin (1) (100) | Epoxy resin (2) (100) | Epoxy resin (1)(50) E828 (50) | E154 |
| Curing agent | HN2200 (67) | same as the left (41) | same as the left (74) | same as the left (90) |
| Curing accelerator | EM124 (1) | same as the left (1) | same as the left (1) | same as the left (1) |
| Izod impact strength(ps) *1 | 1.3 | 1.2 | 1.7 | 1.3 |
| Glass transition temperature (° C.) *2 | 182 | 191 | 160 | 170 |
| Water absorption (%) *3 | 0.40 | 0.36 | 0.42 | 0.61 |

*1: JIS-K-6911
*2: TMA method
*3: Water absorption ratio after immersing in pure water at 23° C. for 7 days.

The epoxy resin composition of the present invention can provide a cured resin having a well-balanced heat resistance and moisture resistance. Therefore, it can be utilized and developed in a wide range of uses, particularly, it can be advantageously employed in uses for electric-electronic fields such as encapsulants for semiconductors, electric insulators, and a lamination board.

We claim:

1. An epoxy resin composition comprising: (A) an epoxy resin containing a trisepoxy compound represented by general formula (I)

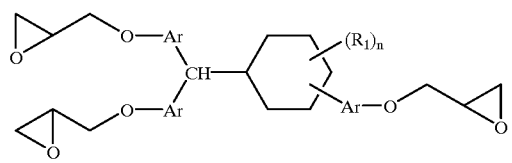

(I)

wherein $R_1$ is a methyl group, n is an integer of 0 to 2, and Ar is a group selected from general formula (II)

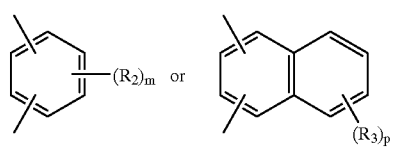

(II)

wherein $R_2$ and $R_3$ are an alkyl group having a carbon number of 1 to 6, an alkoxy group having a carbon number of 1 to 6, or a halogen atom, and m and p are an integer of 0 to 2, and (B) a curing agent for an epoxy resin.

2. The epoxy resin composition of claim 1 wherein the epoxy resin component (A) comprises 5 to 100% by weight of the trisepoxy compound represented by the general formula (I).

3. The epoxy resin composition of claim 2, wherein the epoxy resin component (A) comprises 10–90% by weight of oligomer components of said trisepoxy compound together with said trisepoxy compound represented by general formula (I);

wherein said oligomer components of said trisepoxy compound is represented by the general formula:

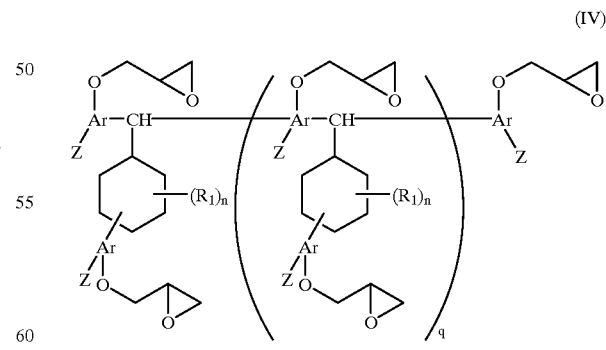

(IV)

wherein $R_1$, Ar, and n are the same as mentioned in claim 1, q is an integer of 1 to 5, and Z is a hydrogen atom and general formula (V),

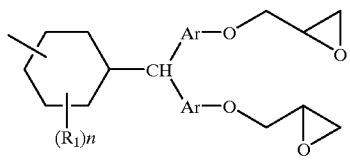

(V)

wherein R₁ and Ar are the same as above-mentioned.

4. The epoxy resin composition of claim 2 wherein the epoxy resin component (A) comprises 15 to 85% by weight of an epoxy compound having at least 2 epoxy groups in a molecule other than said trisepoxy compound represented by general formula (I).

5. The epoxy resin composition of claim 1 wherein the curing agent component (B) is a compound selected from the group consisting of amines, acid anhydrides, polyphenols, imidazoles, borontrifluoride complexes of an amine, dicyandiamides, hydrazides of an organic acid, polymercaptans, and organic phosphines.

6. The epoxy resin composition of claim 1 wherein the curing agent component (B) is present in an amount within the range of 0.1 to 200 parts by weight based on 100 parts by weight of said epoxy resin component (A).

* * * * *